April 15, 1958    G. G. GREEN    2,830,638
TIRE CHAIN

Filed March 27, 1956    2 Sheets-Sheet 1

INVENTOR.
GWYLAM G. GREEN
BY
Kimmel & Crowell
ATTORNEYS

April 15, 1958 G. G. GREEN 2,830,638
TIRE CHAIN
Filed March 27, 1956 2 Sheets-Sheet 2
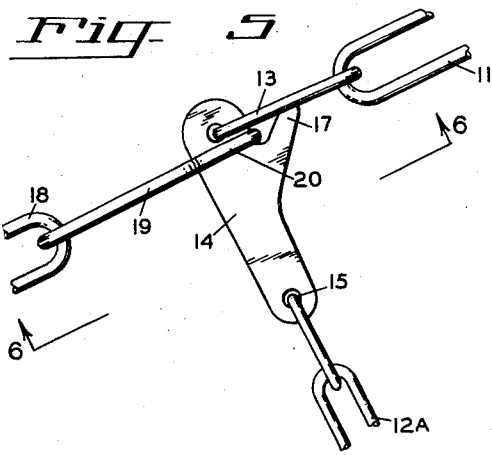
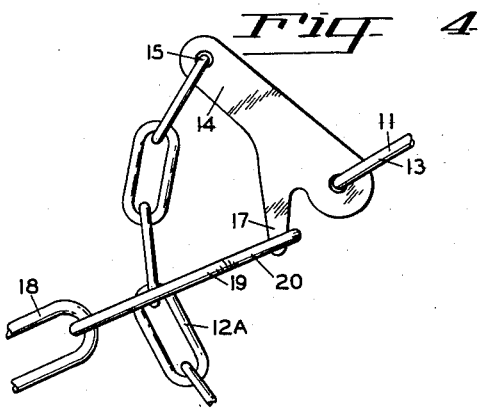
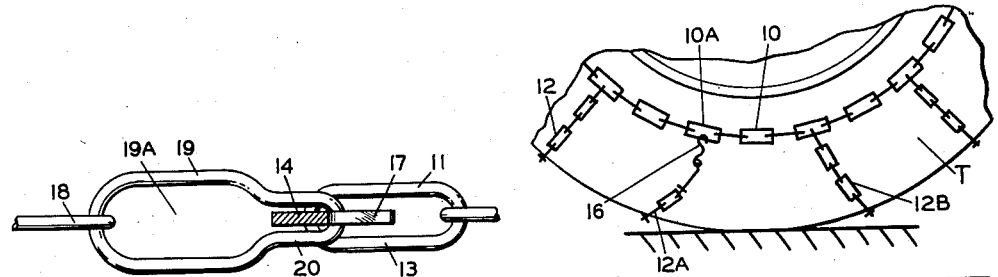
INVENTOR.
GWYLAM G. GREEN
BY Kimmel & Crowell
ATTORNEYS

United States Patent Office 2,830,638
Patented Apr. 15, 1958

2,830,638

TIRE CHAIN

Gwylam G. Green, Salem, Oreg.

Application March 27, 1956, Serial No. 574,126

1 Claim. (Cl. 152—213)

The present invention relates to tire chains, and more particularly, to the chain securing mechanism.

The primary object of the invention is to construct a tire chain that is simple and easy to apply to the tire, as well as being easy to remove from the tire.

With a tire chain constructed according to the invention, the operator can apply the chain to the wheel of the vehicle without raising the wheel of the vehicle. He can secure the inner binding chain without seeing the mechanism, therefore not needing to see the work he need not lie down on the ground to get his head under the vehicle. He can also remove the chain without seeing what he is doing, simply using the sense of touch.

A further object of the invention is to provide a chain that can be applied to the tire and wheel without moving the vehicle forward or backward or raising the same off the ground, which is especially advantageous when the tire is resting on ice or the like, the chain being applied to the tire temporarily, and the vehicle then being moved and the chain cinched up into final operating position.

Other objects and advantages will become apparent in the following specification when considered in the light of the attached drawings, in which:

Figure 3 is a fragmentary side elevation which illustrates how the inner binding chain is being brought together ready for locking the same in running position.

Figure 4 is a fragmentary side elevation which illustrates a further progression of the connecting operation.

Figure 5 is a fragmentary side elevation which illustrates how the ends of the binding chain are brought together and secured.

Figure 6 is a fragmentary sectional view, taken on the line 6—6 of Figure 5, looking in the direction indicated.

Figure 7 is a fragmentary side elevation which illustrates how the chain is applied to the tire without jacking the wheel up or moving the same backward or forward over the chain.

Figure 1:
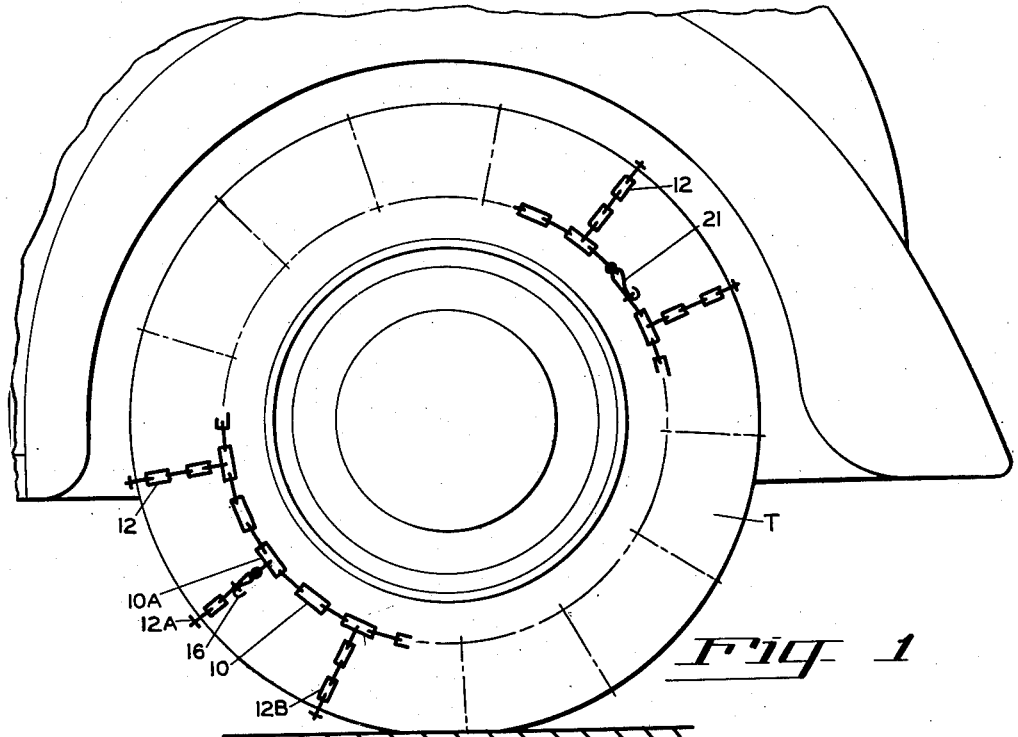
Figure 1 is a side elevation of a chain constructed according to the invention and applied to the tire of a vehicle.
Figure 2:
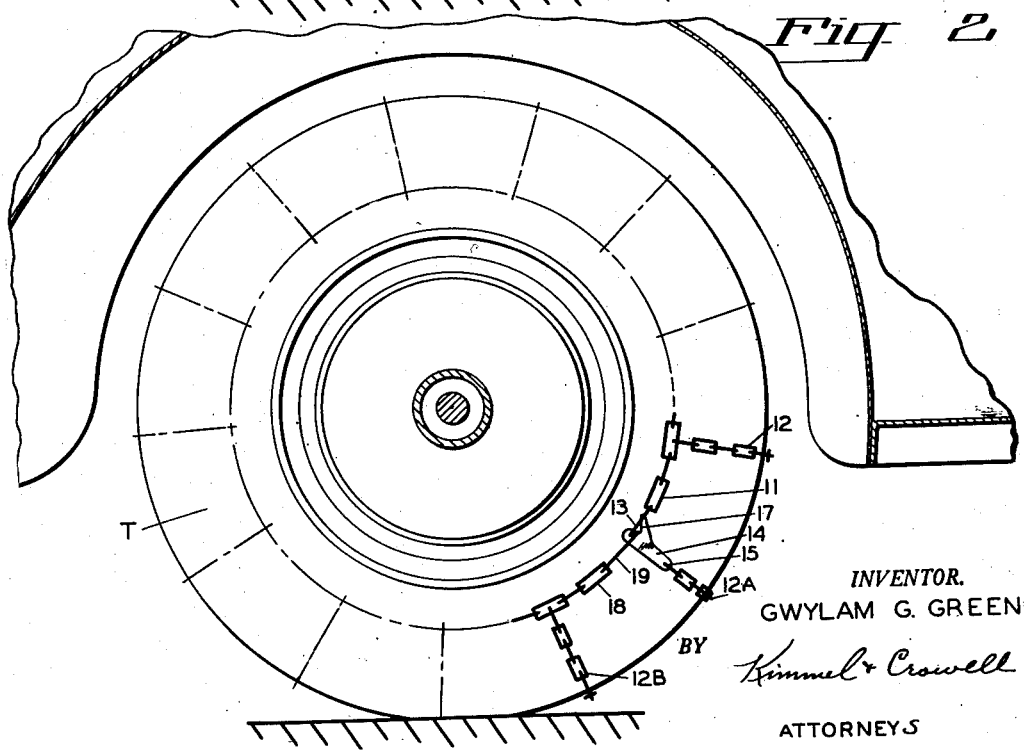
Figure 2 is a side elevation of the inside of the wheel, taken on a section through the fender and axle looking outwardly from the vehicle.

Referring now to the drawings in detail wherein like reference numerals indicate like parts throughout the several figures, the reference numeral 10 indicates an outer binding chain in a tire chain set. Parallel to the chain 10 extends a continuous binding inner chain 11, with the usual cross tread chains 12 extending therebetween. In the drawings there is illustrated a simple chain, but actually these cross tread chains are of any special twisted link design having the usual non-skid cleats thereon.

Secured to end 13 of the binding chain 11 is a special connecting lever 14. Connected at 15 to the opposite end of the lever 14 is one of the cross tread chains 12A. Located on the opposite end of the chain 12A is a connecting hook 16. Formed on one side of the connecting lever 14 is a hook or spur 17. The purpose of which will be later described.

Connected to the opposite end 18 of the binding chain 11 is a special link 19, having an enlarged end 19A, and a reduced narrow portion 20 formed on its opposite end, which is adapted to receive the connecting lever 14 as later described. The outside binding chain 10 is connected together by a connecting hook 21.

Referring particularly to Figures 1, 3, 4 and 5, the inner binding chain 11 is placed over the top of the tire T. The outer binding chain 10 is connected together by its connecting hook 21. This hook 21 may be completely connected or partially connected, if partially connected it provides operating slack within the binding chain 10, referring to Figures 3, 4 and 5. The operator reaches around behind the tire T from any convenient position, particularly that as shown, and threads the hook 16 of the cross chain 12A into and through the enlarged end 19A of the link 19, as illustrated in Figure 3. He can do this without seeing this operation.

He then pulls the chain through the link 19 as further illustrated in Figure 4, at which point he hooks the narrow portion 20 of the link 19 over the spur 17 of the lever 14. By continuing to pull the chain 12A from the inside of the tire T around the tire T towards the outside of the tire T he moves the lever 14 to the position shown in Figure 5. This pulls the binding chain 11 tightly together, at which time the hook 16 of the cross chain 12A is hooked into the link 10A of the outside binding chain 10, as best illustrated in Figure 1. The connecting link 21 of the outside binding chain 10 can then be locked in place for operation. The above method of mounting was performed when the vehicle could be backed up over the cross chain 12B, as illustrated in the drawings.

The chain of the invention can be applied to the tire T in cases where the tire T is on ice and the vehicle cannot be moved forward or backward. There is sufficient distance between the cross chain 12B and the cross chain 12C to slip under the tire T at its point of contact on the ground surface without moving the vehicle forward or backward, which would be the case on an icy surface.

The cross chain 12A is next threaded through the link 19, as above described, bringing the same around under the tire T adjacent its contact with the ground surface and hooking the hook 16 loosely into the outside binding chain 10, there being sufficient length of the cross chain 12A to do this. The power of the vehicle can then move the same by the assistance of the chain a sufficient distance over an icy surface to complete the hook up of the cross chain 12A. Next the outer binding chain 10 can be tightened up with the connecting link 21 to its proper operating position.

From the above description of operation it can be readily understood that the operator need not lie down to apply the chain or remove the same, but only has to drop the chain over the top of the tire T, rest on one knee, reach around behind the tire T and thread the hook 16 through the link 19 pulling towards himself until the spur 17 can be slipped into the portion 20 of the link 19, then by simply pulling on the same the inner binding chain will be brought together after which the hook 16 is brought around to the front of the tire and hooked into the binding chain 11, making a very quick installation of the tire chain.

To remove the chain, the hook 16 is simply unhooked from the outside binding chain 10 and allowed to slack, at which time the same can be readily pulled from the enlarged portion 19A of the link 19 disconnecting completely the inner binding chain 11, allowing the same to be slipped from over the top of the tire T.

Having thus described the preferred embodiment of the invention, it should be understood that numerous structural modifications and adaptations may be resort- ed to without departing from the scope of the appended claim.

What is claimed is:

A tire chain comprising a pair of spaced apart parallel inner and outer binding chains, a plurality of cross chains each secured at one end to one of said binding chains and at its opposite end to the other of said binding chains, an elongated flat lever, said lever having bores extending therethrough at the opposite ends thereof, a camming spur integrally formed on said lever adjacent one end thereof and extending therefrom at an oblique angle to a line passing through the axes of said bores, said lever having a length greater than the length of the individual link in said binding chain, said lever having an end link on said inner chain engaged through the bore in the end thereof adjacent said camming spur, a lever engaging locking link of a length greater than said lever mounted on the end of said inner chain opposite said lever, a locking cross chain having a link at one end thereof engaged through the bore in said lever at the opposite end from said camming spur, and a chain engaging hook secured to said locking cross chain at the end thereof opposite said lever, said locking cross chain passing through said locking link with said locking link engaged by said camming spur and in cooperation with said end link on said inner chain securing said locking link thereon, said locking cross chain being secured to the outer binding chain by said chain engaging hook.

References Cited in the file of this patent

UNITED STATES PATENTS

| Re. 23,221 | Fox | Apr. 25, 1950 |
| 1,672,019 | Barber | June 5, 1928 |
| 2,059,100 | Green | Oct. 27, 1936 |
| 2,074,616 | Martel | Mar. 23, 1937 |